April 18, 1961 W. HAEUSSERMANN 2,980,839
ELECTRIC MOTOR
Filed Feb. 12, 1959 7 Sheets-Sheet 1

Walter Haeussermann,
INVENTOR.
BY S. J. Rotondi,
A. T. Dupont,
V. L. Billings, and
Alvin E. Moore,
ATTORNEYS.

April 18, 1961  W. HAEUSSERMANN  2,980,839
ELECTRIC MOTOR
Filed Feb. 12, 1959  7 Sheets-Sheet 2

Walter Haeussermann,
INVENTOR.
S. J. Rotondi,
BY A. T. Dupont,
V. L. Billings, and
Alvin E. Moore,
ATTORNEYS.

April 18, 1961   W. HAEUSSERMANN   2,980,839
ELECTRIC MOTOR
Filed Feb. 12, 1959   7 Sheets-Sheet 3

Walter Haeussermann,
INVENTOR.

BY S. J. Rotondi,
A. T. Dupont,
V. L. Billings, and
Alvin E. Moore,
ATTORNEYS.

April 18, 1961 W. HAEUSSERMANN 2,980,839
ELECTRIC MOTOR
Filed Feb. 12, 1959 7 Sheets-Sheet 6

Walter Haeussermann,
INVENTOR.

BY S. J. Rotondi,
A. T. Dupont,
V. L. Billings, and
Alvin E. Moore,
ATTORNEYS.

United States Patent Office 2,980,839
Patented Apr. 18, 1961

2,980,839

ELECTRIC MOTOR

Walter Haeussermann, Huntsville, Ala., assignor to the United States of America as represented by the Secretary of the Army Filed Feb. 12, 1959, Ser. No. 792,929

12 Claims. (Cl. 318—138)

(Granted under Title 35, U.S. Code (1952), sec. 266)

The invention described herein may be manufactured and used by or for the Government for governmetal purposes without the payment of any royalty thereon.

This invention relates to an electric motor. Before such a motor may be efficiently adapted for use in the vacuum of space or of a low-pressure chamber, such as a test chamber for instruments, certain inventive problems must be solved.

The absence of air, which would permit heat transfer from the motor by convection, makes desirable a minimum of heat losses in the field excitation and in the commutator system. This absence of air presents an especially important problem in any of the types of motors that require commutation of the motor-energizing current.

The ordinary mechanical commutator, comprising a ring or disc assembly in contact with current-collecting brushes, does not function well in a vacuum as the heat of its friction and sparks is not dissipated by ambient air. Such a commutator that is used on a motor that is inaccessible for repair for a long period of time, for example in the vacuum of space or of a long-closed low-pressure chamber, also involves the danger of too short a life for its intended purpose. This danger would still exist, to a certain extent, if the motor were housed in a vacuum-surrounded, gas-pressurized small container. Such a container would entail extra weight, complication and inaccessibility.

In view of these facts, an object of this invention is to provide a direct-current motor (or other direct-current commutating machine) with a permanent magnet field excitation that produces little or no heat.

Another object of this invention is to provide a direct-current commutating machine having a frictionless, low-heat commutator.

A further object of the invention is to provide a direct-current commutating machine that has an impedance commutator.

Another object is to provide a combined electric motor and generator assembly that utilizes a single impedance become more fully apparent from the following detailed commutator.

The foregoing and other objects of the invention will description of exemplary structure embodying the invention and from the accompanying drawings, in which.

Figure 1:
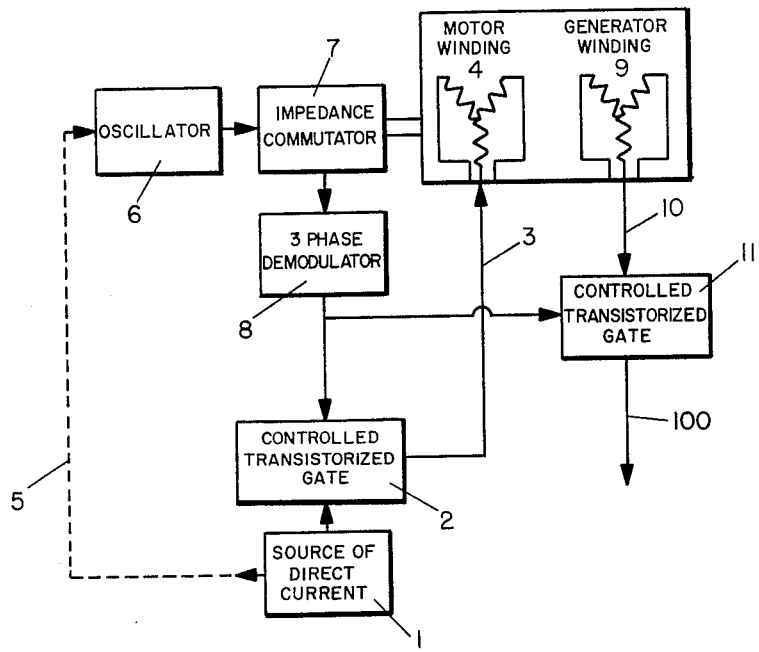
Figure 1 is a schematic view of an electric motor and generator unit and an impedance commutator for controlling current to and from the unit.

As shown in the drawings, the direct-current commutating machine of the invention comprises: a rotary permanent-magnet means, for exciting a magnetic field; a fixed armature; an oscillator to convert direct current to alternating current for use in an impedance commutator; a frictionless, impedance commutator for commutating the direct current that is supplied to the windings; and bearings for the rotor that are specifically designed for funcioning in this assembly while it is in a vacuum.

In Figure 1, the source of direct current 1 (which may be a set of solar cells, a generator and/or battery) supplies current via transistorized gate 2 and conductors 3 to armature 4 and also supplies current via conductors 5 and oscillator 6 to impedance commutator 7. Alternating-current voltages that are formed, by variation of the inductance or capacitance in the commutator, are demodulated by demodulator 8, and thence supplied to transistorized gate 2, for commutating the current that energizes the motor coils.

In Figure 1, the motor and generator are indicated as being closely associated. In such a combined motor and generator, generator windings 9 preferably would be in the same slots as the motor windings 4 and utilize the magnetic field of the same permanent magnets. However, the generator armature may be axially spaced from the motor armature, or may be eliminated.

If the generator is part of the assembly, the same impedance commutator, 7, may be utilized to commutate both the motor and generator current. In this event the generated current is conducted from the generator via conductors 10, and is commutated by means of transistorized gate 11. This gate, which is similar to gate 2, is controlled by pulses from demodulator 8.

Figure 3:
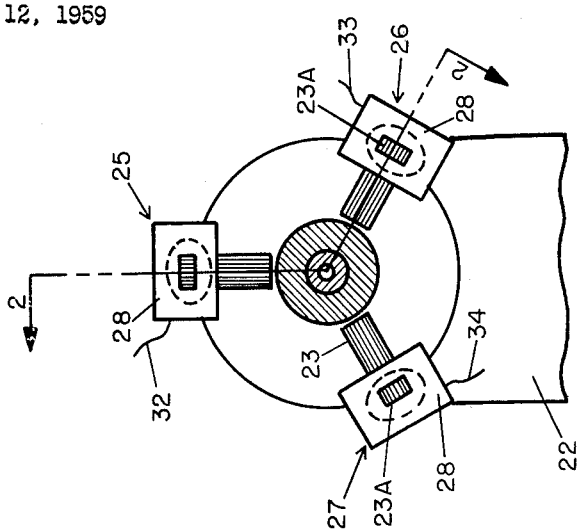
Figure 3 is a sectional view taken along the line 3—3 of Figure 2.
Figure 2:
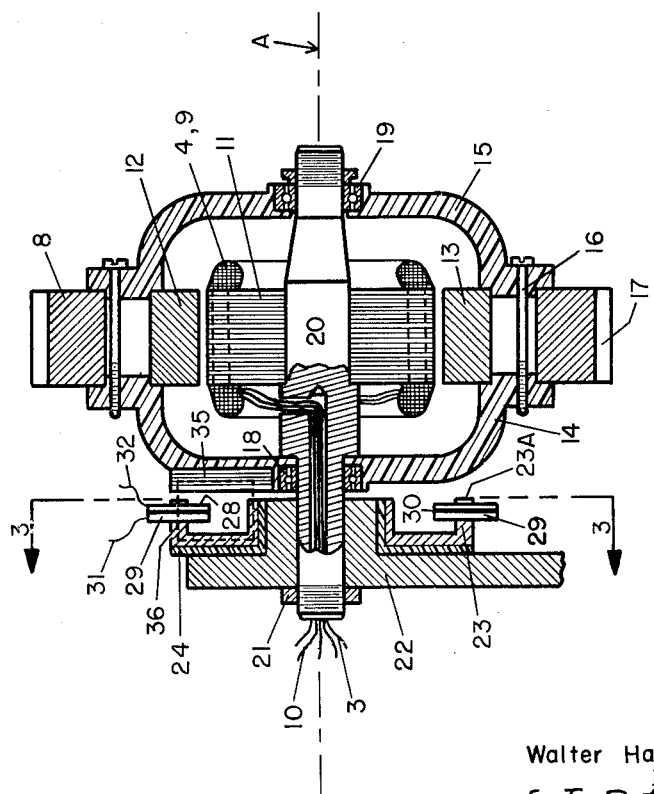
Figure 2 is a sectional view of an embodiment of the motor (and/or generator), shown as driving a flywheel and/or gear, taken along the line 2—2 of Figure 3.

An example of the structure of the motor and generator, designed for a three-phase circuit, is shown in Figures 2 and 3. The stator is shown as comprising motor and generator windings 4, 9 that are in the same slots of the laminated core 11 and are connected with conductors 3, 10.

In this type of assembly, rotary permanent field magnets, 12 and 13 (Figure 2), are used, thus eliminating the heat that would be generated in field coils and in the mechanical commutator that would be used in a conventional direct-current motor.

Although a mechanical commutator would not be required in an alternating current induction motor, such a motor would not be efficient in a vacuum because of heat and power losses in its armature winding, which result from the electrical excitation of the necessary magnetic field. On the other hand, no variable-speed alternating current motor that utilizes a permanent magnet field is available. In view of these facts, the motor of this invention preferably utilizes rotary permanent magnets, a stationary armature and a frictionless, impedance commutator that provides pulses of alternating current for commutation of the current that is supplied to the motor.

In the form of the invention shown in Figure 2, the permanent magnets 12 and 13 are clamped between two side walls 14 and 15 of the rotor. These walls are made of reinforced plastic aluminum, magnesium, or other non-magnetic material, and are fastened together by bolts 16 or the like.

Also clamped between members 14 and 15, there is an annular member 8, which may be a flywheel or other rotary machine element. This element, for instance, may be used both as a weighted flywheel and gear 17, or as a flywheel alone (with gear 17 eliminated), or as a pulley that is substituted for gear 17.

Within the apertures of the housing side walls, bearings 18 and 19 are supported, thereby journaling the rotor, radially and in thrust, on axle 20. These anti-friction bearings are especially designed for efficient functioning in the vacuum environment of the motor. Steel balls or rollers and races will not so function, but will freeze together in the vacuum. The races and balls or rollers of this invention may be made of any of the following materials: quartz; glass; ceramics; bronze; or ceramic material with particles of molybdenum disulphate or of carbon interspersed in it. For example, carbon baked in a ceramics matrix may be used for the races and/or balls.

In the form of Figure 2 axle 20 is supported between the inner race of bearing 18 and nut 21, by support element 22, which may be a bracket, pedestal, or the like. This element supports magnetic core 23, which may be of sintered iron, or, as shown in Figure 3, of laminated iron or steel. If support element 22 is of magnetic material e.g., steel, a non-magnetic layer 24 of plastic, aluminum or other non-magnetic material is interposed between elements 22 and 23; otherwise, this layer may be eliminated.

Projecting core elements 23A are encased by a plurality of pairs (25, 26 and 27, Figure 3) of inductive coils, each of said pairs comprising separate coils 28 and 29 separated by a layer 30 (Figure 2), of non-magnetic material, such as plastic. These pairs of coils are equal in number to the number of phases of the motor; in the case of Figures 2 and 3, three pairs of such coils are shown, each pair comprising a coil 29 that receives voltage from a conductor, e.g., 31 (Figure 2), and a coil 28 that, under certain circumstances, transmits an induced voltage via one of conductors 32, 33 and 34. In lieu of the pairs of coils, 28 and 29, single coils may be utilized.

Non-magnetic rotor wall 14 has embedded in it a single magnetic core element 35, which in Figure 2 is shown as of laminated iron. When the rotor is rotated and core 35 comes opposite a pair of coils (25, 26 or 27) on core 23, a path 36 of magnetic flux is completed, through core 23, coils 28 and 29 and core 35, and a pulse of voltage is formed in coil 28 and transmitted to conductor 32, 33 or 34. The interval between pulses through one of the conductors (32, 33 or 34) is shortened (with an increase in frequency) the faster the motor turns, and is lengthened (with a decrease in frequency) when the motor turns more slowly. The frequency of the voltage coming successively from the conductors 32, 33 and 34 thus is a measure of the speed of the rotor; and the pulses of voltage are timed to coincide with the phases of the motor, thus constituting a commutation of the current received from conductor 31, with division of the current in accordance with the varying relative positioning of the poles of rotary field magnet 12—13, relative to the stationary coils of windings 4, 9.

Figure 4:
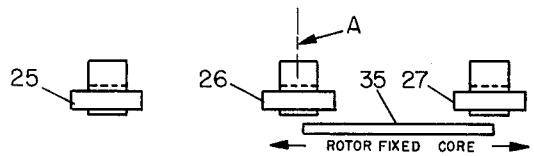
Figure 4 is a schematic, developed view indicating the impedance commutator, comprising a magnetic core piece that rotates with the motor and fixed coils of an inductance type of frictionless, impedance commutator, of the type shown in Figures 2 and 3.
Figure 6:
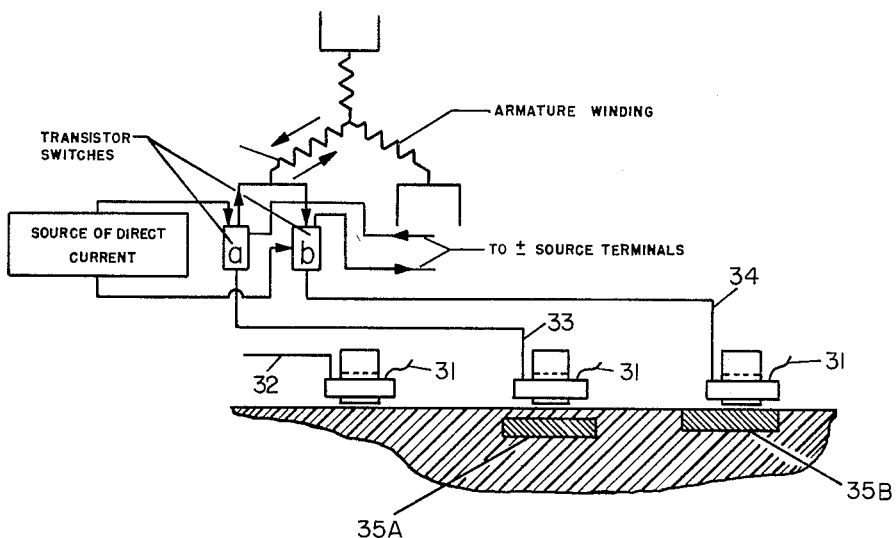
Figure 6 is a schematic view indicating another embodiment of the inductance type of frictionless commutator.

The above-described frictionless, impedance commutator may be referred to as an inductance commutator. A second embodiment of such an inductane commutator is shown in Figure 6. This embodiment comprises an alternative type of core, 35. Instead of being in one piece as shown in Figure 4, the core 35 comprises two separate core elements, 35A and 35B, with element 35A being at a further distance from the annulus of the coils 25, 26 and 27 than element 35B. This variation in the air gap between the coils and parts of core 35 provides for plus or minus direction of the current in the armature winding by means of separating filter and resonance circuits and demodulators (shown in schematic detail in Figure 8). Transistor switches $a$ and $b$ are controlled by the demodulators, thus sending current in the direction through the motor winding coils that is determined by the particular air gaps that exist for the moment between the impedance commutator elements 25, 26 and 27 and core elements 35A and 35B.

Figure 5:
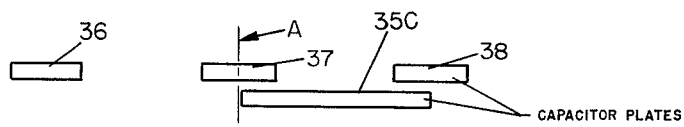
Figure 5 is a schematic, developed view, similar to Figure 4, but indicating a capacitive reactance type of frictionless, impedance commutator.

Another type of frictionless, contactless impedance commutator may be referred to as a capacitive commutator. This type, having a variable capacitance comprising plates 36, 37 and 38 in lieu of the above-described variable inductance means of Figure 4, is illustrated in Figure 5. These plates as well as capacitor plate 35C (which is substituted in this form for the magnetic core 35 of Figure 4) may be printed circuit plates.

An impedance commutator (alternatively of the inductance or capacitive type) is shown in Figure 1 as receiving alternating current from the oscillator 6, because in this motor system the direct current that is utilized should be converted into the alternating current that is necessary to excite the variable impedance in the contactless, frictionless commutator. However, if the source of current should be an alternating current generator, oscillator 6 would be eliminated. Any of the known types of oscillators may be utilized as element 6. This element supplies alternating current to the various conductors that are connected to the coils or capacitance plates of the impedance commutator.

Figure 7:
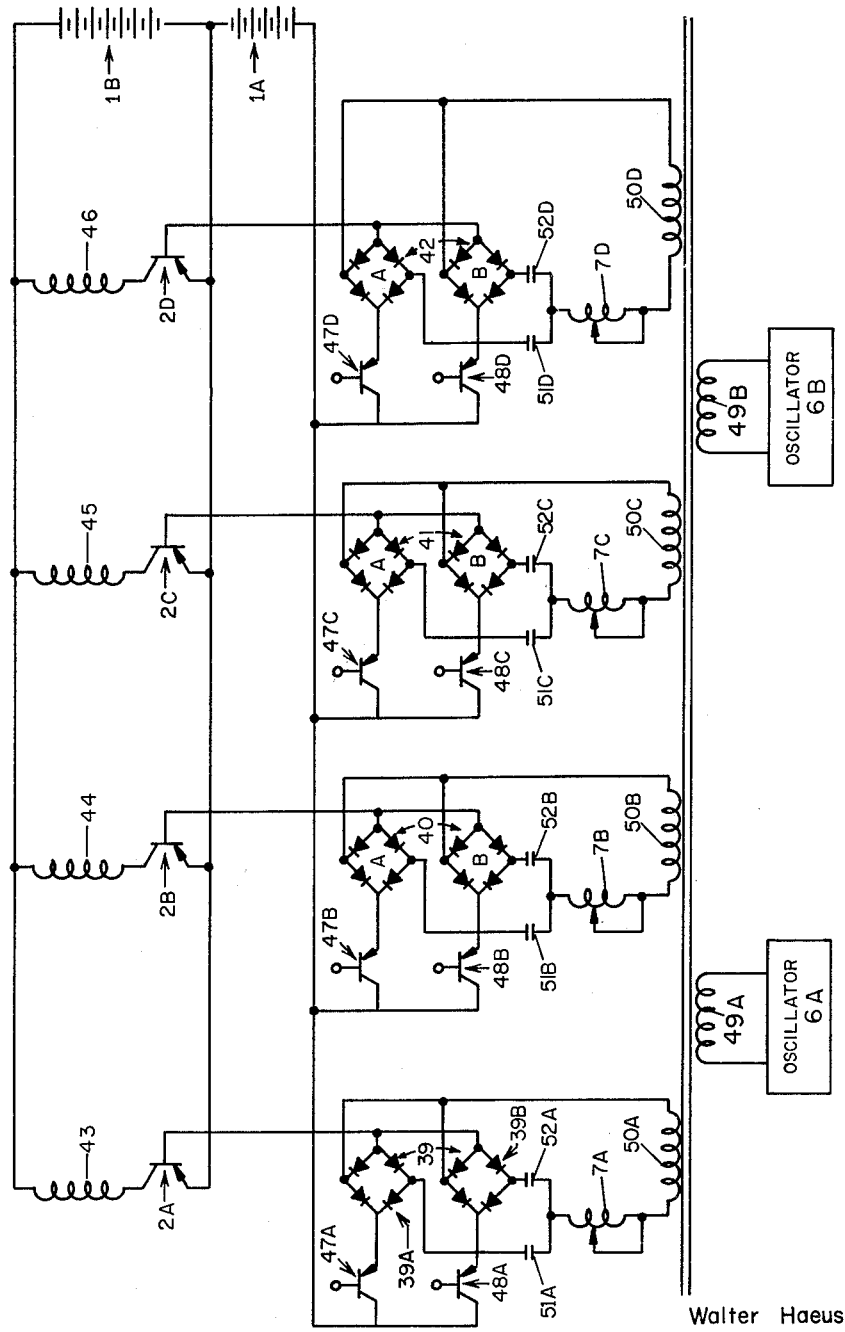
Figure 7 is a schematic diagram showing another embodiment of the motor circuits, wherein the motor has four coils, and the impedance commutator, demodulator and controlled gate are modified for four-phase commutation of the motor-actuating current.

The alternating-current voltage that comes in successive pulses through conductors 32, 33 and 34 (Figure 3 or 6) is transmitted to demodulator 8 (Figure 1), which rectifies the current, converting it into direct-current pulses. Any rectifier that is appropriate for functioning with the phase of the voltage coming from the commutator and the current utilized in the motor may be used in the invention. The four-phase demodulator assembly indicated in Figure 7 comprises four sets of four diodes, 39(A and B), 40(A and B), 41(A and B) and 42(A and B), for functioning in connection with the windings 43, 44, 45 and 46 of a four-phase motor.

These four windings are displaced 90°. Power from electrical source 1B is applied to each of the windings through the power transistors 2A, 2B, 2C and 2D. The power transistors are controlled by the position of the rotor.

For such control the rotor carries a disk, part of which, as in Figure 2, consists of ferromagnetic material, the other part of which consists of non-ferrous material. This disk runs through the gap of the cores of chokes 7A, 7B, 7C and 7D. The inductance varies according to whether or not the ferromagnetic section of the disk is in the gap, being higher when the gap is filled with the ferromagnetic section, and smaller during the period in which the non-ferromagnetic section passes through the gap.

Two sets of transistor switches for each motor winding, 47A–D and 48A–D, which may be controlled, for example, by a control computer, determine the direction of rotation. Forward speed requires closed transistors in group 47A–D and open transistors in group 48A–D, whereas reverse speed requires open transistors in group 47A–D and closed transistors in group 48A–D.

The oscillators 6A and 6B apply their two frequencies, $f_1$ and $f_2$, through transformer windings 49A and 49B to each of the secondary windings 50A-D. The capacitor group 51A-D is tuned to the frequency $f_1$ of oscillator 6A; whereas capacitor group 52A-D is tuned to the frequency $f_2$ of oscillator 6B.

Considering one winding only, for example 43, one revolution of the motor, divided into two periods, involves the following conditions:

*Period 1.*—With the ferromagnetic section in the choke gap, the inductance and capacitor 51a are tuned to $f_1$ and detuned to $f_2$. The resonant current from $f_1$ is rectified in rectifier 39A, flows through the closed transistor 47A and the bias battery 1A, thus closing transistor switch 2A. The current of the frequency $f_2$ is small relative to the resonant curve.

*Period 2.*—With the non-ferromagnetic section in the choke gap, the inductance and capacitor are detuned to $f_1$ and $f_2$. The current is small relative to the resonant curve. The transistor switch 2A is therefore open.

In both periods no current can flow through capacitor 52A and rectifier 39B because of the open transistor 48A. This sequence involves forward torque.

In reverse torque, transistor group 47A-D is open and group 48A-D is closed. Therefore, no current can flow through capacitor 51A and rectifier 39A.

During period 1 the inductance and capacitor 52A are detuned to $f_1$ and $f_2$. During period 2 the current is small again; during this period the inductance and capacitor 52A are tuned to $f_2$. The resonant current flows through rectifier 39B, closed transistor 48A and the bias battery 1A, thus closing the transistor switch 2A. Capacitor 52C and the inductance are detuned to the frequency $f_1$, with a current that does not appreciably influence the system. The resulting torque is in the reverse direction.

A variation of the oscillator and impedance commutator control, utilizing only one oscillator 6, has the resonant circuits properly matching the capacitors 51 and 52 to the two position indicating impedances, Figure 6, whereby the transistor switches 47 and 48 are selectively controlled by means of demodulators 39, 40, 41 and 42.

Since the four chokes, 7A-D, are mounted with a displacement of 90° the described operation of the four electronic devices is shifted in phase 90°. Therefore, the currents applied to the windings 43, 44, 45 and 46, in sequence, generate a rotating field that corresponds to the rotation of the permanent magnet.

At the same time that controlled gate 2 is receiving direct-current pulses and functioning to control the application of alternating current to the motor windings, controlled gate 11 (Figure 1) also is receiving pulses from demodulator 8. This second controlled gate may be of the same type as controlled gate 2, and when used in a four-phase circuit may be similar to the transistorized gate assembly shown in Figure 7. This gate receives alternating-current voltage from generator winding 9, rectifies this voltage and transmits it to circuit 100, which supplies gate-controlled current for any desired useful purpose.

Figure 8:
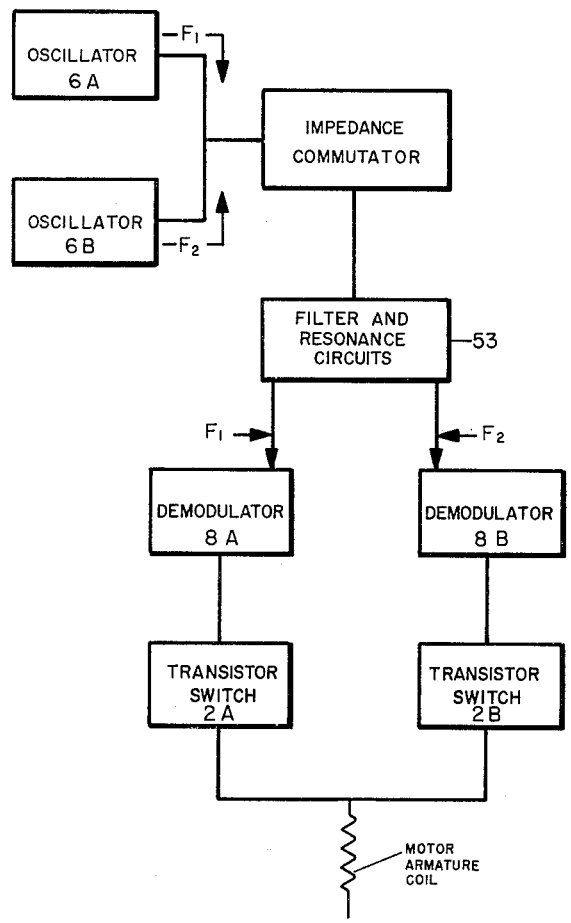
Figure 8 is a schematic diagram of an embodiment of the motor circuits that is alternative to that of Figure 1.

In Figure 8 there is illustrated a form of the control motor circuits which comprises a pair of oscillators, 6A and 6B, supplying voltage of frequencies $F_1$ and $F_2$ to the impedance commutator, two demodulators 8A and 8B, and two transistor switches or controlled gates 2A and 2B. The two frequencies are separated by filter and resonance circuits 53 which direct each frequency (when it is being formed) to a particular one of the demodulators 8A and 8B.

Figure 9:
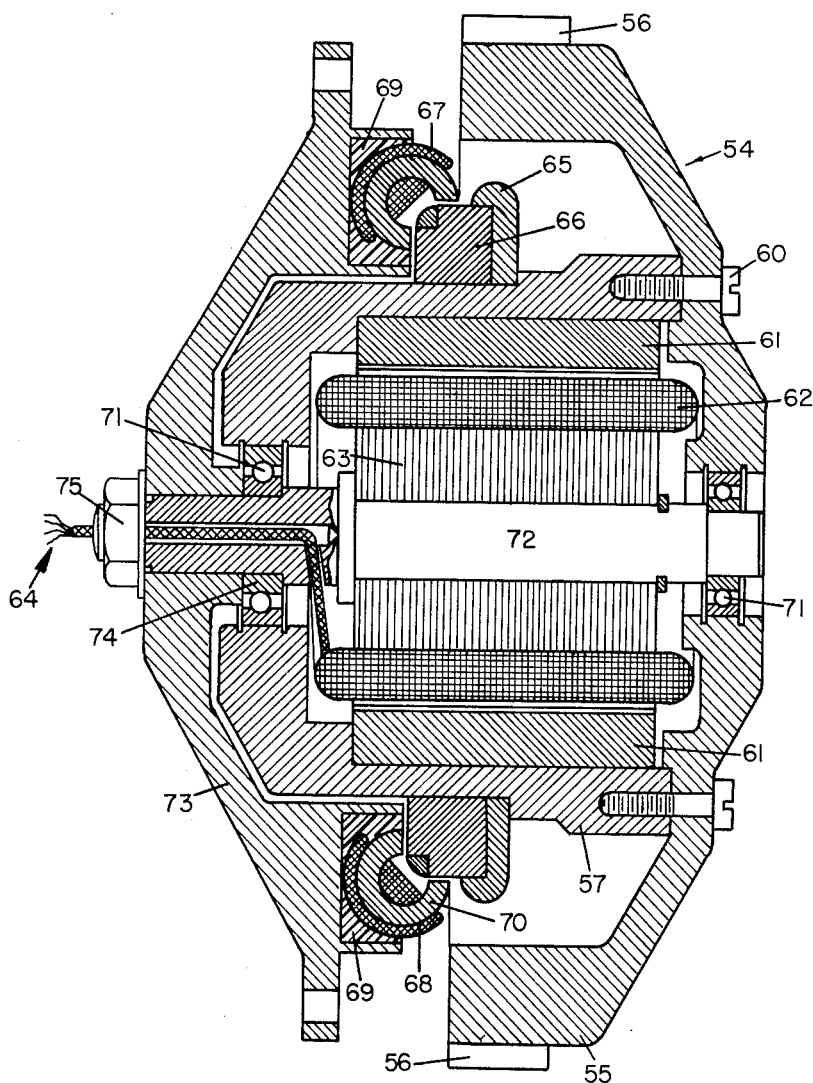
Figure 9 is a sectional view through the axis of a second embodiment of the motor, comprising an inductance commutator.
Figure 10:
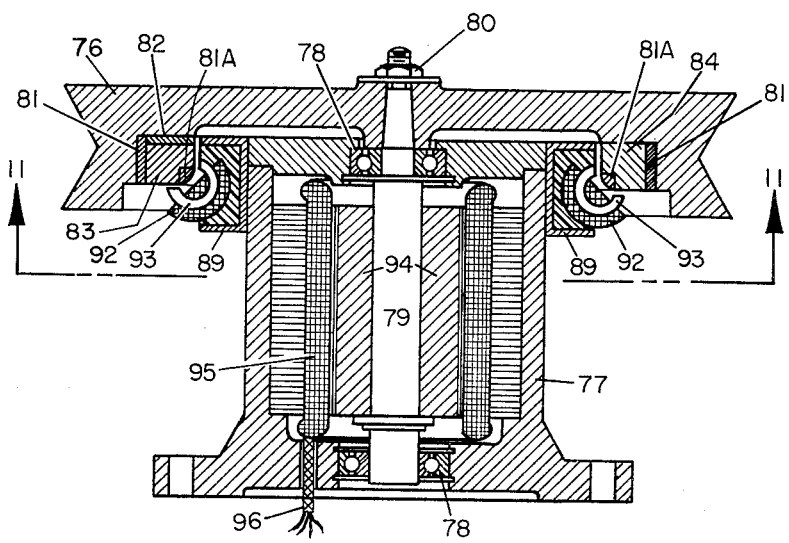
Figure 10 is a sectional view through the axis of a third embodiment of the motor, comprising an inductance commutator.
Figure 11:
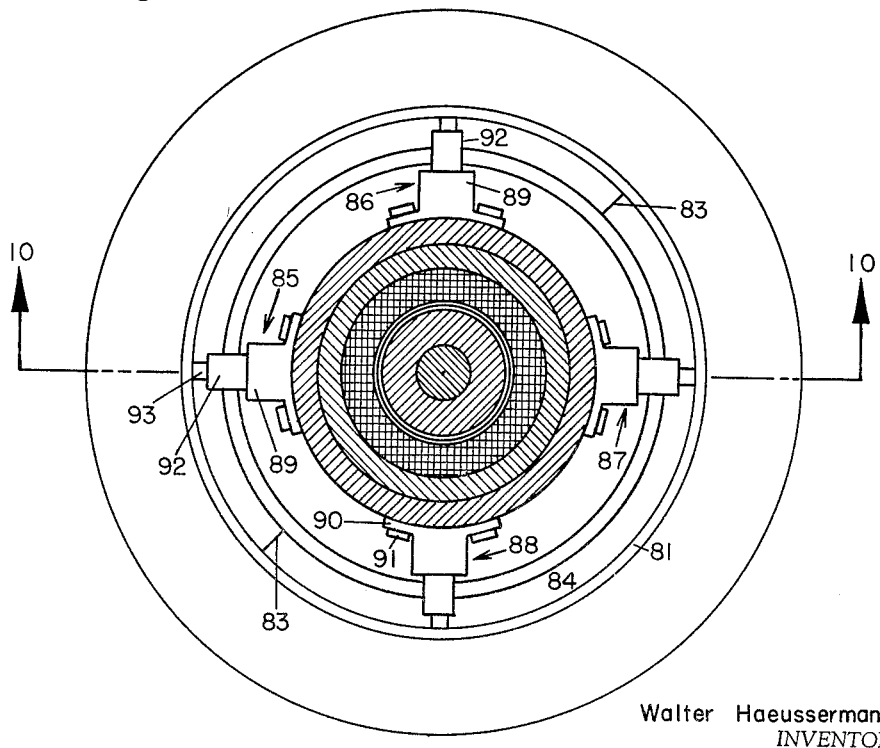
Figure 11 is a sectional view taken from the plane 11—11 of Figure 10.

Figures 9, 10 and 11 illustrate two other forms of the motor of the invention. In Figure 9, the motor is shown as driving flywheel 54, which may be of aluminum or other non-magnetic material, but is shown in this figure as of steel, with parts of aluminum or other non-magnetic material between it and the impedance commutator and motor magnets. The flywheel has a heavy ring 55 which obviously could be made separately from and of heavier material than the remainder of the flywheel), and optionally may include or be replaced by a gear, such as ring gear 56, or by a pulley, or the like.

Non-magnetic housing 57, fastened to flywheel 54 by bolts 60, supports the permanent magnets 61 of the electric motor. Within the rotor of these magnets, the fixed armature 62 is located. The armature windings are located within slots in laminated-iron core 63 and receive commutated current from conductors 64 and controlled gate 2.

Embededd within the aluminum or other non-magnetic material of core-holding ring 65 of the rotary assembly, there is a magnetic core element 66 which functions similarly to previously described element 35, to induce voltages in the four impedance commutator coils of this four-phase motor. In the sectional view of Figure 9 two such coils, 67 and 68, are shown; the other two may be considered as being on opposite sides of the plane of the section. The coils are embedded in plastic 69, and have magnetic cores 70. As shown in Figure 9, core piece 66 is in momentary position to induce a voltage in coil 67.

Bearings 71, of the type previously described, are supported on non-rotating shaft 72, which is fixed to motor support 73 by means of a shaft shoulder that is held against inner race 74 by nut 75.

In Figures 10 and 11, steel flywheel and/or pulley 76 is shown as being supported relative to motor housing 77 by means of bearings 78, in which bearings rotary shaft 79, that is fixed to pulley 76 by nut 80, is journaled. Within rotary element 76 ring 81 and parti-annular apertured disk 82, both of aluminum or other non-magnetic material, house parti-annular core piece 83, which in this form extends through a little less than 180°, around the drive rotary element 76. The remainder of the 360° of ring 81 is filled with a parti-annular ring 84 of aluminum or other non-magnetic material. Core piece 83 is L-shaped in cross section and is supported on its inner side by holding ring 81A, which is of aluminum or other non-magnetic material.

As the core piece rotates, it coacts to form magnetic circuits with four impedance coil assemblies 85, 86, 87, and 88 (Figure 11). Each of these assemblies comprises: an oblong housing 89 of aluminum or other non-magnetic material, fastened to motor casing 77 by means of side flanges 90 and bolts 91; impedance coil 92; and parti-annular magnetic core 93, that is circular in cross section.

In the form of the invention shown in Figures 10 and 11, shaft 79 of the rotary element is fixed to and driven by permanent magnets 94, which coact with armature windings 95, when the windings receive commutated current from conductors 96. Alternatively, when the machine is used as a generator, current is supplied from conductors 96 and through the impedance commutator to a useful circuit.

Within the scope of the subjoined claims, the invention comprehends various obvious changes in the specific structure that is herein illustrated. For example, the rotary element that is driven by (or that drives) the rotor of the electric machine obviously may have a gear adjacent its axis instead of its periphery, as shown, or may be any type of toothless rotor, such as a friction wheel, conveyor roll, or the like.

The following invention is claimed:

1. An electric motor comprising: a rotary supporting means having non-ferrous material; a rotatable permament magnet carried by said means exciting a magnetic field; a non-rotary armature; an oscillator for converting direct current to alternating current; a source of direct current connected to said oscillator; a frictionless contactless impedance commutator comprising a reactance element that is fixed relative to said armature and receives current from said oscillator, and a rotary magnetic element that is supported by said supporting means, a portion of the non-ferrous material of said supporting means being located between said impedance element and said permanent magnet; and a transistorized gate, electrically connected with said impedance commutator and with said armature for supplying commutated current to said armature.

2. In an electric commutating machine: a rotor comprising a non-ferrous supporting means and a permanent magnet that is carried by said supporting means and provides a rotor-propulsive magnetic field; a stator, comprising a winding and a conductor attached thereto; a frictionless, contactless impedance mechanism, electrically connected to said conductor, comprising a rotary impedance element that is fixed to said non-ferrous supporting means in a position substantially outside said rotor-propulsive magnetic field, a portion of said non-ferrous supporting means being between said impedance element and said permanent magnet, and an impedance device that is fixed relative to said stator and adjacent the circle of rotation of said impedance element; a conductor electrically connected to said impedance device; and a source of electric current that is connected with said last-named conductor.

3. A multiphase electric machine comprising the structure set forth in claim 2, in which said impedance device comprises a plurality of impedance elements equal in number to the phases of said machine, each of said elements being connected with said last-named conductor.

4. A device as set forth in claim 2, in which said non-ferrous supporting means comprises non-magnetic side walls, said magnets being fixed between said side walls, fastening means for holding said side walls in supporting relation to said magnets, and a rotary element supported by said side walls.

5. An electric machine, adapted for use in a vacuum, having the structure set forth in claim 2, and comprising a support for said stator, said impedance device being fixed to said last-named support, and spaced sets of non-ferrous, antifriction bearings, each set having an inner race fixed to said support and an outer race fixed to said rotor.

6. An electric machine having the structure set forth in claim 2, in which said impedance device comprises an inductance coil and said impedance element is of magnetic material.

7. A multiphase electric machine having the structure set forth in claim 2, in which said impedance device comprises a plurality of coils equal in number to the phases of the machine and said impedance element comprises a magnetic element embedded in the non-ferrous material of said supporting means.

8. A multiphase electric machine having the structure set forth in claim 2 in which said impedance device comprises a plurality of capacitor plates equal in number to the phases of the machine and said impedance element comprises a rotary capacitor plate.

9. A device as set forth in claim 2, in which said impedance element comprises a pair of magnetic parts, the circles of rotation of said parts being spaced at different distances from said impedance device.

10. A device as set forth in claim 9, in which said impedance device comprises a plurality of inductance coils.

11. A multiphase electric machine, adapted for use in a vacuum, having the structure of claim 4, in which said impedance device comprises a number of inductance coils equal to the number of phases of the machine, and in which said impedance element comprises a core piece of magnetic material embedded in said non-magnetic side walls, and which machine further comprises a non-rotary support, a shaft fixed to said support, said winding being fixed to said shaft, and a spaced pair of non-ferrous, antifriction bearings, each pair having an outer race fixed to one of said side walls, an inner race fixed to said shaft, and roller elements between said races.

12. An electric machine assembly comprising: a support a rotatable non-magnetic housing; permanent magnets fixed to said housing; an electric motor armature winding and a generator armature winding located axially inward of said magnets and fixed to said support; an oscillator for converting direct current to alternating current; a source of direct current connected to said oscillator; a contactless, transistorized impedance commutator comprising a reactance element fixed relative to said support and electrically connected to said oscillator, an element influenced by electric current that is fixed to and rotatable with said housing, the circle of its rotation being adjacent to said reactance element and substantially outside the effective field of said permanent magnets, a demodulator receiving pulses of voltage from said reactance element, and a transistorized gate electrically connected to said source of direct current and demodulator and controlled by pulses from said demodulator to supply commutated current to said motor winding; a second transistorized gate that is electrically connected to said demodulator and to said generator winding; a circuit for supplying current for use; said second gate being controlled by pulses from said demodulator to supply current from said generator to said circuit.

References Cited in the file of this patent
UNITED STATES PATENTS

| 2,797,376 | Meade | June 27, 1951 |
| 2,821,675 | Ostenso et al. | Jan. 28, 1958 |